United States Patent
Krieg et al.

(10) Patent No.: US 7,591,179 B2
(45) Date of Patent: Sep. 22, 2009

(54) MICROMECHANICAL MOTION SENSOR (75) Inventors: Dietmar Krieg, Kirchheim/Teck (DE);
Udo-Martin Gomez, Leonberg (DE);
Reinhard Neul, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/556,172

(22) PCT Filed: Mar. 24, 2004

(86) PCT No.: PCT/DE2004/000604

§ 371 (c)(1),
(2), (4) Date: Feb. 12, 2007

(87) PCT Pub. No.: WO2004/102116

PCT Pub. Date: Nov. 25, 2004

(65) Prior Publication Data

US 2007/0180907 A1    Aug. 9, 2007

(30) Foreign Application Priority Data

May 8, 2003    (DE)    ............................ 103 20 725

(51) Int. Cl.
*G01P 9/04* (2006.01)
(52) U.S. Cl. .................................................. 73/504.12
(58) Field of Classification Search .............. 73/504.12, 73/504.13, 504.14
See application file for complete search history.

(56) References Cited

U.S. PATENT DOCUMENTS

| 5,025,346 | A  |   | 6/1991 | Tang et al. |
| 6,267,008 | B1 | * | 7/2001 | Nagao ..................... 73/504.12 |
| 6,520,017 | B1 | * | 2/2003 | Schoefthaler et al. .... 73/514.02 |
| 6,553,833 | B1 | * | 4/2003 | Funk et al. ............... 73/504.14 |

FOREIGN PATENT DOCUMENTS

| DE | 196 42 893 | 4/1997 |
| DE | 199 39 998 | 3/2001 |
| EP | 0 943 893  | 9/1999 |

* cited by examiner

*Primary Examiner*—John E Chapman
(74) *Attorney, Agent, or Firm*—Kenyon & Kenyon LLP (57) ABSTRACT

A micromechanical motion sensor is capable of detecting a deflection imparted to an oscillatably mounted bar spring element excited to a permanent periodic oscillation by an electrostatic oscillating drive to which a periodic drive voltage is applied. To compensate non-linearities of the resonance frequency response of the bar spring element, a sum of a normal drive voltage signal and a compensation drive signal may be applied to a comb drive. In an alternative embodiment, separate compensation comb drive units may be additionally provided to the comb drive units used for the oscillation drive and a compensation voltage signal may be applied to them to compensate for the non-linearity.

20 Claims, 6 Drawing Sheets

(B)
$U_{PKA,\ Drive}$

(C)
$U_{PKI,\ Drive}$

MICROMECHANICAL MOTION SENSOR

FIELD OF THE INVENTION

The present invention relates to a micromechanical motion sensor capable of detecting a deflection imparted to an oscillatably mounted bar spring element excited to permanent periodic oscillation by an electrostatic oscillating drive to which a periodic drive voltage is applied. Such a micromechanical motion sensor which uses bar springs and comb drives among other things is described in U.S. Pat. No. 5,025,346.

BACKGROUND INFORMATION

Bar springs exhibit non-linear effects when subjected to high deflections. In a yaw rate sensor manufactured by the applicant (Robert Bosch GmbH model MM2R), a rotor is suspended in its center of rotation on an X spring that includes bar springs (see appended FIG. 3). This non-linear effect is clearly detectable even for deflections as small as ±4°. It is manifested in a shift of the resonance frequency of the system. In addition, areas exhibiting a plurality of stable operating states may appear as a result of the non-linearity. If a sudden transition occurs between the stable states during operation due to minor interference, for example, the performance of the yaw rate sensor may be considerably impaired.

Figure 3:
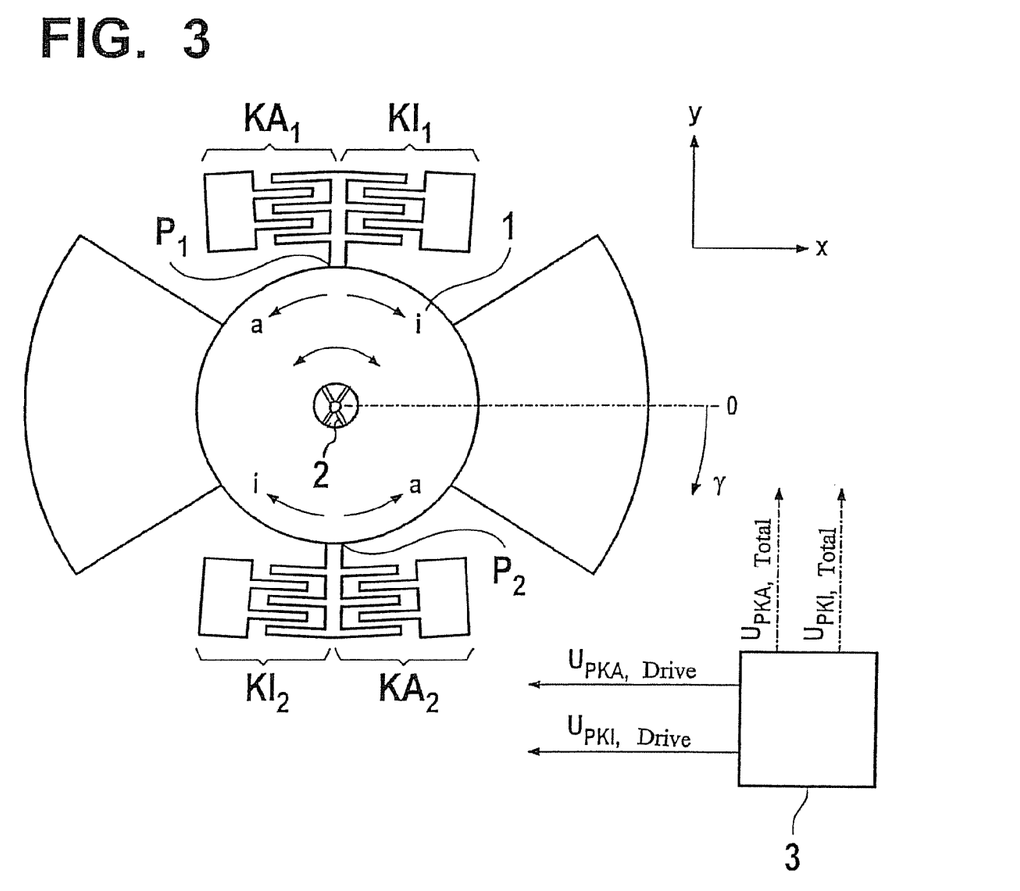
FIG. 3 shows a schematic top view of the above-described yaw rate sensor configured as a micromechanical motion sensor and indicates at the same time a first exemplary embodiment of the yaw rate sensor (compensated) according to the present invention.

In the yaw rate sensor (model MM2R) manufactured by the present Applicant and schematically illustrated in FIG. 3, due to a centrally mounted X spring 2, the bar spring element has a centrally mounted and centrally symmetric inertial mass 1 which is excited to a periodic rotary oscillation in a lateral plane x, y having positive and negative deflections i, a of the same magnitude about a rest position O (angle γ designates the deflection angle in positive direction i) by symmetrically acting comb drives. A first comb drive pair has two comb drive units KI1 and KA1 opposite one another, which act upon a first drive point P1 situated on a circular arc-shaped peripheral segment of inertial mass 1. These two first comb drive units KI1 and KA1, which are provided for a deflection in positive direction i and negative direction a, respectively, are situated parallel to a an imaginary straight line connecting the center of X spring 2 to the rest position of inertial mass 1. A second pair of comb drive units KI2, KA2 for positive deflections i and negative deflections a, respectively, situated centrally symmetrically to the first pair of comb drive units KI1, KA, acts upon a second point of application P2 diametrically opposite first point of application P1 on inertial mass 1. The latter two comb drive units KI2 and KA2 are situated parallel to an imaginary straight line connecting the center of inertial mass 1 to point O denoting the rest position.

Figure 4:
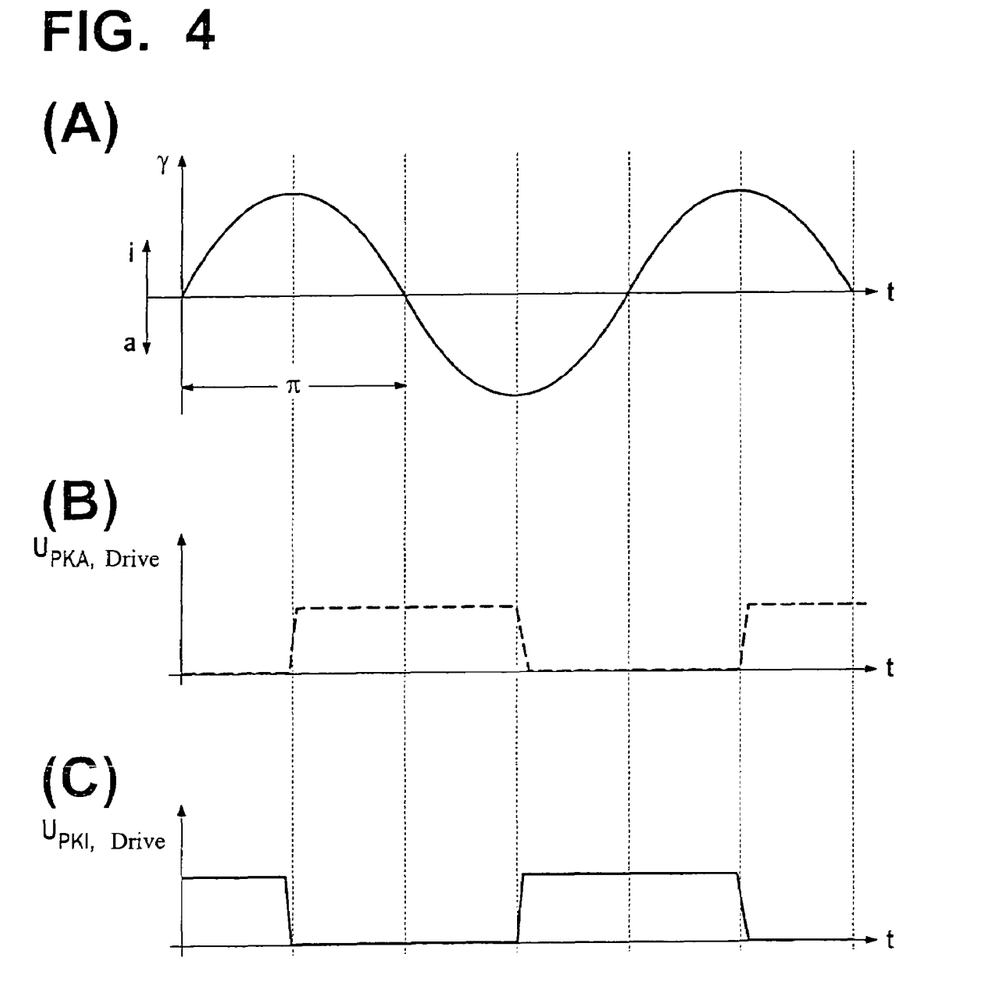

A control unit 3 generates drive voltages $U_{PKI,drive}$ and $U_{PKA,drive}$ for comb drive units KI1 and KI2 (for excitation in positive deflection direction i) and for comb drive units KA1 and KA2 (for excitation in negative deflection direction a), respectively, as shown in appended FIG. 4. FIG. 4 shows in top part A the periodic and, in the ideal case, harmonic excitation function γ(t) of inertial mass 1 in positive direction i and negative direction a, which has the period 2π.

In center FIG. 4B, a dashed line shows the square pulse-shaped drive voltage $U_{PKA,drive}$ for comb drive units KA1 and KA2 for deflection in negative direction a, while bottom FIG. 4C shows drive voltage $U_{PKI,drive}$ for comb drive units KI1, KI2 for positive deflection in phase opposition to drive voltage $U_{PKA,drive}$, the positive deflection also having square pulses having the periodicity of periodic excitation oscillation γ(t) shown in FIG. 4A.

In addition, FIG. 4 shows that the pulses of drive voltage $U_{PKI,drive}$ for positive deflection i according to FIG. 4C are generated symmetrically to the positive zero crossings of periodic oscillation γ(t) of inertial mass 1, while the pulses of drive voltage $U_{PKA,drive}$ for negative deflection i according to FIG. 4B are generated symmetrically to the negative zero crossings of periodic excitation oscillation γ(t) according to FIG. 4A. Since the comb drive units (KI and KA) schematically shown in FIG. 3 are each able to exert a force in one direction only, a plurality of comb drive units are needed to set the rotor in an oscillating motion.

For practical reasons, a square-wave voltage is generated for the drive voltage applied by control unit 3 instead of the sinus curve. This is accomplishable using a control logic and a voltage pump in control unit 3. In principle, a voltage pump is made up of a capacitor which is charged. This allows higher voltages than the operating voltage to be generated for a short period. This voltage is used if needed.

Figure 1:
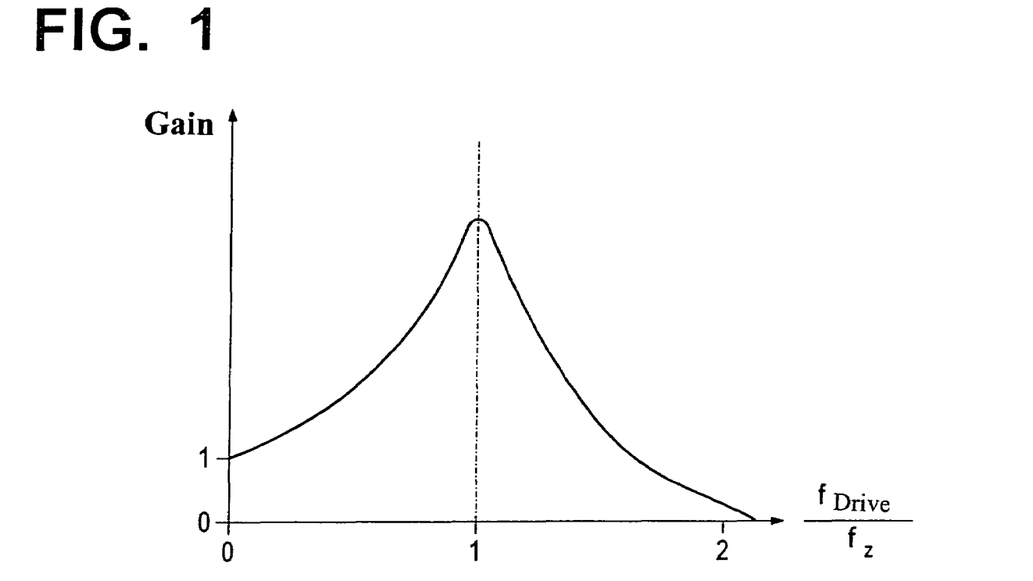
FIG. 1 graphically shows the frequency response of the gain (resonance curve) in the linear case with attenuation.
Figure 2:
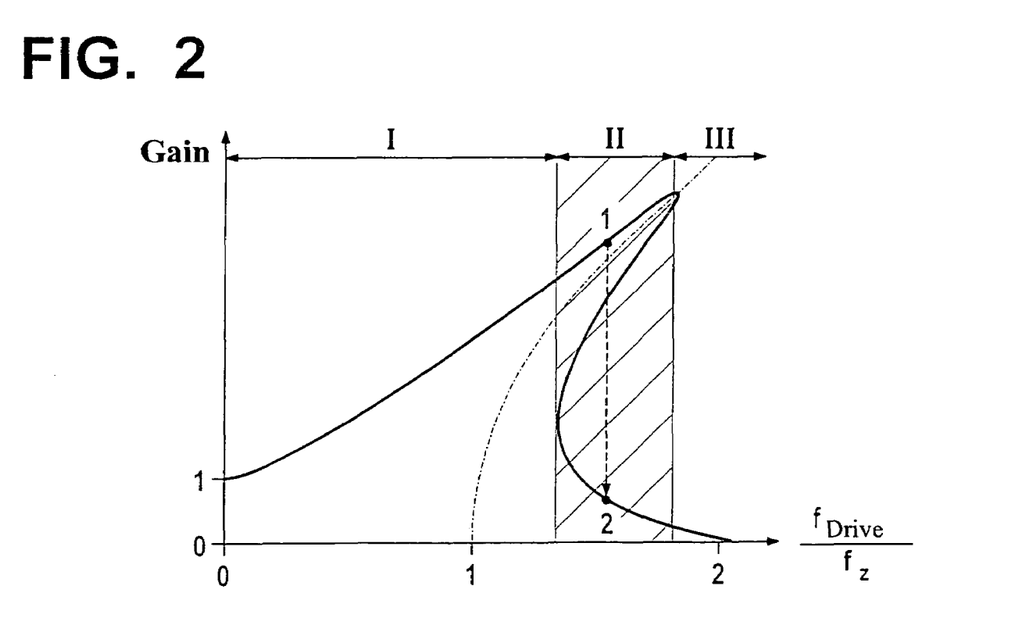
FIG. 2 graphically shows the frequency response of the gain in the non-linear case in which, as explained above, the maximum of the resonance curve tends to the right.

The non-linear bending of the bar is describable using Duffing's differential equation. Since this is a known differential equation, a detailed analysis of the dynamic properties is not necessary. Instead, the two main effects (frequency shift and instability) are briefly explained with reference to appended FIGS. 1 and 2. The mechanical non-linearity of the X spring may be described using Duffing's differential equation $$M_{drive}=J_z\dot\gamma+b_{tz}\dot\gamma+k_{tz,0}\cdot(1+k_{tz,NL}\gamma^2)\gamma \qquad (1)$$

or $$M_{drive}=J_z\ddot\gamma+b_{tz}\dot\gamma+k_{tz,0}\gamma+k_{tz,0}k_{tz,NL}\gamma^3 \qquad (2)$$

The parameters are determined via the appropriate finite-element computations.

As can be seen from equation (2), this is a second-order differential equation for oscillation, having linear attenuation term $b_{tz}$ (velocity-proportional attenuation). γ denotes the angle describing the deflection of the rotor. The only difference with respect to the "standard differential equation for oscillation" is additional non-linear term $k_{tz,0}k_{tz,NL}\gamma^3$. Term $k_{tz,0}$ is the linear spring constant (torsion). Term $k_{tz,NL}$ describes the non-linearity. $J_z$ denotes the moment of inertia of the rotor about the z axis. The rotor oscillation is excited via drive moment $M_{drive}$.

Appended FIG. 1 shows the resonance curve of the gain in the linear case with attenuation. The gain factor attains its maximum at the exact moment when the system is excited by its intrinsic frequency. In the non-linear case, the maximum of the resonance curve is shifted to the right. As can be seen from appended FIG. 2, the resonance curve tends additionally to the right. The one-to-one correspondence between gain and excitation frequency is thus lost. The gain in each individual case depends on the previous history. For example, in the case of a smooth increase in the excitation frequency, there is a slow transition from area I to area II and thus to point 1 in FIG. 2. In the case of supercritical excitation and a slower reduction in the drive frequency, the operating state migrates from area III to point 2 in area II. This makes two different states possible for one drive frequency. In general, this is an undesirable effect, because, for example, interference pulses may cause a sudden transition from point 1 to point 2. The risk of a sudden change exists in the entire area II (shaded in FIG. 2).

Only the basic analytical equation in principle is given here as the operating principle of comb drives:

$$F_x \approx \epsilon_0 \Delta U^2 (h/d_0) \qquad (3)$$

The following relationships are discernible from equation 3:

The greater voltage difference (ΔU) on the capacitor plates of the comb drive, the greater drive force $F_x$.

The greater height h of the comb drive structure, the greater drive force $F_x$.

The smaller distance $d_0$ between the capacitor plates of the comb drive, the greater drive force $F_x$.

These are only the basic relationships. Detailed examination shows that the force is caused by the formation of stray fields. Therefore, in a more accurate analysis, the field lines must be used for computing the force. For more complex geometries, the relationships may be determined using finite element computations.

SUMMARY OF THE INVENTION

As explained previously, the object of the present invention is to avoid the above-described problems in a micromechanical motion sensor, in particular in a yaw rate sensor equipped with comb drive units or in a linear oscillator due to mechanical non-linearity, and to provide such a micromechanical motion sensor in which non-linearities are compensated.

According to an essential aspect, a micromechanical motion sensor for achieving this object according to the present invention is characterized in that electrostatic compensation drive means acting upon the bar spring element are provided, to which a suitable periodic compensation voltage is applied to compensate the non-linearity of the resonance frequency response of the bar spring element.

If such a micromechanical motion sensor is configured as a yaw rate sensor on the basis of the aforementioned basic structure of the yaw rate sensor manufactured by the present Applicant, the bar spring element has a centrally symmetric inertial mass (rotor) which is centrally mounted with the help of a centrally situated X spring and is excited by the oscillation drive to a rotary oscillation in a lateral X-Y plane for positive and negative deflections of the same magnitude about a rest position; the oscillation drive has at least one comb drive unit controlled by a control unit using the periodic drive voltage for exciting the inertial mass for positive and negative deflections, whose drive forces act upon the inertial mass tangentially at least one first point of application situated in the same X-Y plane in such a way that they excite, i.e., drive the inertial mass symmetrically about its rest position; and the compensation drive means have at least one comb drive unit for compensating the non-linearities in the positive and negative deflection directions, which acts upon the same point of application and/or upon a second point of application situated diametrically opposite thereto at the same distance from the center of the inertial mass.

In one embodiment, the compensation comb drive units may be identical to at least one of the pairs of comb drive units. In another embodiment, at least one additional pair of compensation comb drive units are provided for compensation in addition to the comb drive units used for normal excitation.

If a micromechanical motion sensor of this type is configured as a linear oscillator, the bar spring element has a system of a plurality of inertial masses connected by a centrally situated coupling spring and mounted by a symmetric spring suspension so it is able to perform linear oscillations, the system being excited by the oscillation drive to a linear oscillation in a lateral plane with positive and negative deflections of the same magnitude about a central rest position; for exciting the inertial mass system in the positive and negative deflection directions, the oscillation drive has at least one comb drive unit controlled by a control unit, the drive forces of the comb drive unit acting upon the inertial mass system at a plurality of points of application situated in the same lateral plane and opposite one another on each inertial mass of the system in such a way that they excite the inertial masses of the system about their respective rest positions; and the compensation drive means have for each inertial mass of the system at least one comb drive unit which acts upon at least one of the points of application of each inertial mass.

Due to the use proposed according to the present invention of comb drive units for compensating the non-linearity, the overall structure made up of bar spring element and comb drive units has a linear characteristic. This eliminates the above-described problems possibly caused by non-linearities.

The above and additional advantageous features of a micromechanical motion sensor according to the present invention, in particular of a yaw rate sensor and a linear oscillator, are elucidated in more detail in the subsequent description of preferred exemplary embodiments with reference to the drawing.

BRIEF DESCRIPTION OF THE DRAWINGS

FIGS. 4A, B, and C, respectively, graphically show the idealized oscillation curve of the centrally mounted inertial mass according to FIG. 3, the drive voltage for the comb drive unit for the negative deflection direction, and the drive voltage for the comb drive units for the positive deflection direction as generated by the control unit according to FIG. 3.

DETAILED DESCRIPTION

To compensate for the mechanical non-linearity of the bending bar, in addition to the previous drive signal (see FIG. 4), a compensation voltage is applied to the comb drive, which accurately compensates for the non-linear term of differential equation 2. It must be kept in mind that comb drives are able to apply forces in one direction only due to their operating principle. Thus, in the case of a positive deflection i, comb drive KA is responsible for the compensation, and in the case of negative deflection a, it is comb drive KI.

The compensation voltage curve results from the analytical relationships for the yaw rate sensor. The moment to be compensated results from equation 2.

$$M_{comp} = k_{tZ,0} k_{tzNL} Y^3 \qquad (4)$$

If this moment is to be applied via the available comb drives (KI1, KI2 and KA1, KA2), the following equation results:

$$M_{comp} = 2\frac{(U_{PKI,PKA} - U_{PCM})^2 \varepsilon_0 h}{d_0} k_{stray} n_{comb} r_{eff} \quad (5)$$

$$= k_{tz,0} k_{tz,NL} \cdot |\gamma|^3$$

where $K_{stray}$ is a correction factor for taking into account stray field effects; $n_{comb}$ is the number of combs, and $r_{eff}$ is the resulting effective radius for calculating the drive moment. $U_{PCM}$ denotes the common reference potential of all comb drives.

Equation 5 may be solved for voltage $U_{PKI}$ (voltage applied to comb drive units KI1, KI2) or $U_{PKA}$ (voltage applied to comb drive units KA1, KA2), to obtain the compensation voltage $$U_{PKI,PKA,comp} = \sqrt{\frac{k_{tz,0} k_{tz,NL} d_0}{2h\varepsilon_0 k_{stray} n_{comb} r_{eff}} \cdot |\gamma|^3} + U_{PCM} \quad (6)$$

Adding drive voltage $U_{PKI, PKA, drive}$ (see FIG. 4) and compensation voltage $U_{PKI, PKA, comp}$ computed in equation 6 yields the ideal voltage curve applied to comb drives $U_{PKI,PKA,tot}$. In practical applications, this curve must be approximated by a stepped graph.

Thus, in a first exemplary embodiment, total voltage $U_{PKA,tot}$ and $U_{PKI,tot}$ according to FIG. 6F, formed from the sum of the respective drive voltages $U_{PKA,drive}$ and $U_{PKI,drive}$ (FIGS. 6B and C) and the respective compensation voltages $U_{PKA,comp}$ and $U_{PKI,comp}$ according to FIGS. 6D and E, are supplied to the respective comb drive units KA1, KA2 and KI1, KI2 according to FIG. 3 to compensate the non-linearity. To do so, control unit 3 generates the total voltages $U_{PKA,tot}$ and $U_{PKI,tot}$ shown, respectively, in FIG. 6F in dashed and solid lines (indicated with dashed lines in FIG. 3) and applies them to corresponding comb drive units KA1, KA2 and KI1, KI2.

In the exemplary embodiment of a yaw rate sensor according to the present invention shown in FIG. 3, the oscillation drive has four comb drive units KA1, KA2 and KI1, KI2, of which a first and second comb drive unit for positive i and negative a deflection form a first pair (KI1, KA1), which has a first shared point of application P1 on inertial mass 1. A third and fourth comb drive unit KI1 and KA2 form a second pair, which act upon the opposite shared point of application on the inertial mass. The two comb drive units KI1, KA1 and KI2, KA2 are situated opposite one another, parallel to an imaginary line which defines rest position O of inertial mass 1 and passes through the center of the very inertial mass. In this way, the drive forces of the comb drive units for positive deflection i and the drive forces of the comb drive units for negative deflection a are added up.

Figure 6:
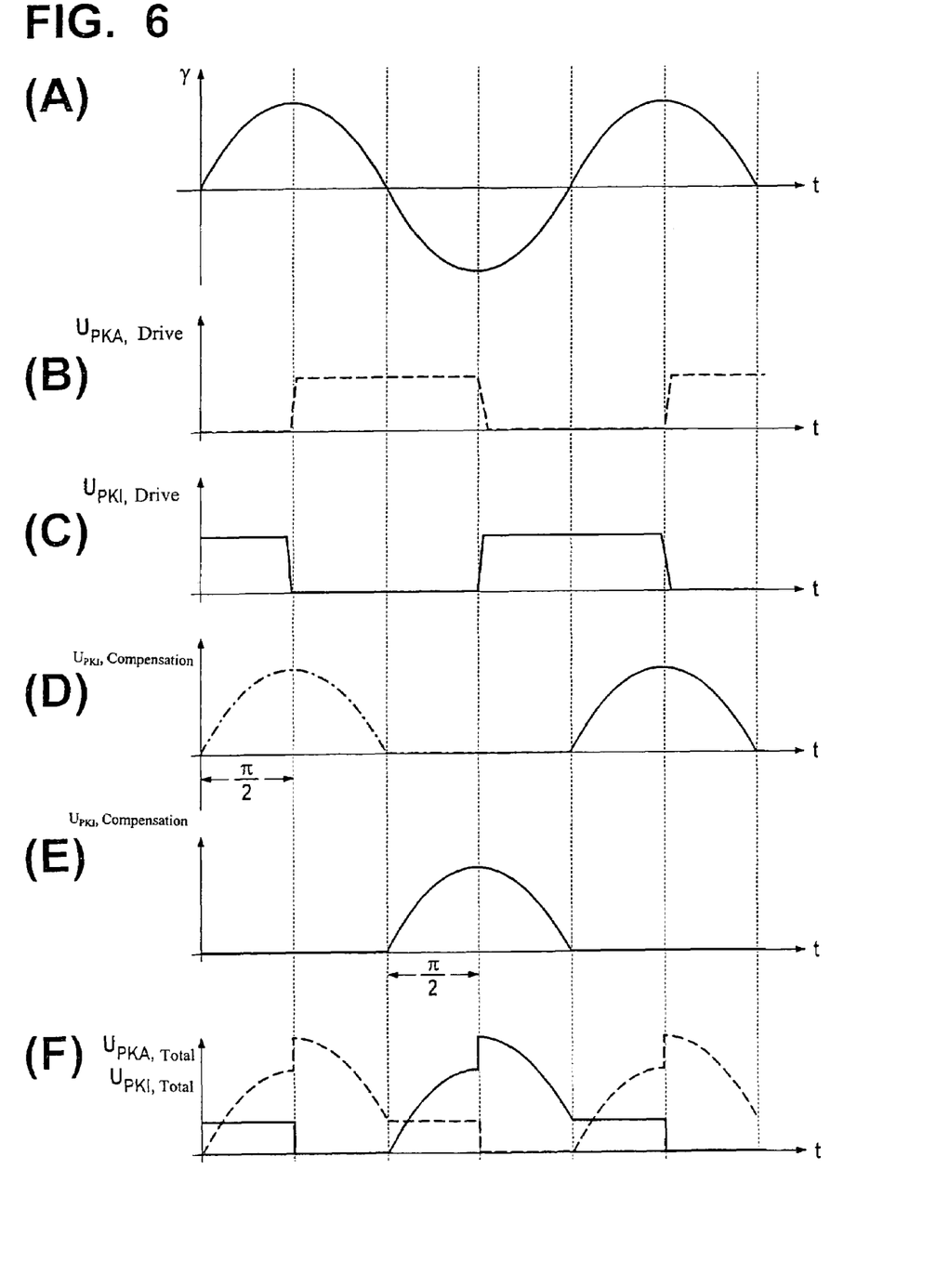
FIGS. 6A-6F graphically show, in addition to the time diagrams according to FIGS. 6A, 6B, and 6C already shown in FIGS. 4A-4C, an oscillation curve of a compensation voltage signal for negative deflection (FIG. 6D), an oscillation curve of a compensation voltage signal for positive deflection (FIG. 6E), and in FIG. 6F a sum of the respective drive voltage signals and the corresponding compensation voltage signal.

According to parts B and C of FIGS. 4 and 6, drive voltage signals $U_{PKA,drive}$ and $U_{PKI,drive}$ generated by control unit 3 are square voltage pulses in phase opposition; control unit 3 generates square voltage pulses $U_{PKI, drive}$ for positive deflection i symmetrically to the positive zero crossings of oscillation curve γ(t) shown in FIG. 4A and square voltage pulses $U_{PKA, drive}$ for comb drive units KA1 and KA2 for negative deflection symmetrically to the negative zero crossings of oscillation curve γ(t).

Compensation voltage signals $U_{PKA,comp}$ and $U_{PKI,comp}$ according to FIGS. 6D and 6E, generated by control unit 3, are also in phase opposition with respect to one another but are symmetric to the deflection maximums in the positive and negative deflection directions, respectively, of oscillation curve γ(t). Thus, compensation voltage signal $U_{PKA,comp}$ for negative deflection is delayed by 90° (π/2) with respect to drive voltage signal $U_{PKI,drive}$ for positive deflection, and compensation voltage signal $U_{PKI,comp}$ according to FIG. 6E is also delayed by 90° (π/2) with respect to drive voltage signal $U_{PKA,drive}$.

To check the practical suitability of a yaw rate sensor compensated as described above, the above equation 6 may be converted into a simulation model using Simulink standard blocks. This simulation model calculates the resulting total voltage from the input signals:

deflection angle γ of inertial mass 1, reference potential $U_{PCM}$, and drive voltage $U_{PKI,drive}$, $U_{PKA,drive}$.

The simulation results have shown that, in order to achieve sufficient compensation of the non-linearity, the total voltages on the comb drive units shown in FIG. 6F and indicated as dashed lines in FIG. 3 must assume a very high voltage level at which conventional comb drive units no longer operate. The recognition of this fact resulted in the second exemplary embodiment shown in FIG. 5, which, in addition to the four comb drive units KI1, KI2 and KA1, KA2 shown in FIG. 3, has four compensation comb drive units KIK1, KIK2 and KAK1, KAK2, which are controlled by control unit 3 exclusively via corresponding compensation voltage signal $U_{PKI,comp}$ or $U_{PKA,comp}$ according to FIGS. 6E and D. In contrast, comb drive units KI1, KI2 and KA1, KA2 of the drive means receive only drive voltage signals $U_{PKI,drive}$ and $U_{PKA,drive}$ shown in FIGS. 6B and 6C from control unit 3, so that the problem of an excessive voltage being applied to a comb drive unit is avoided.

Figure 5:
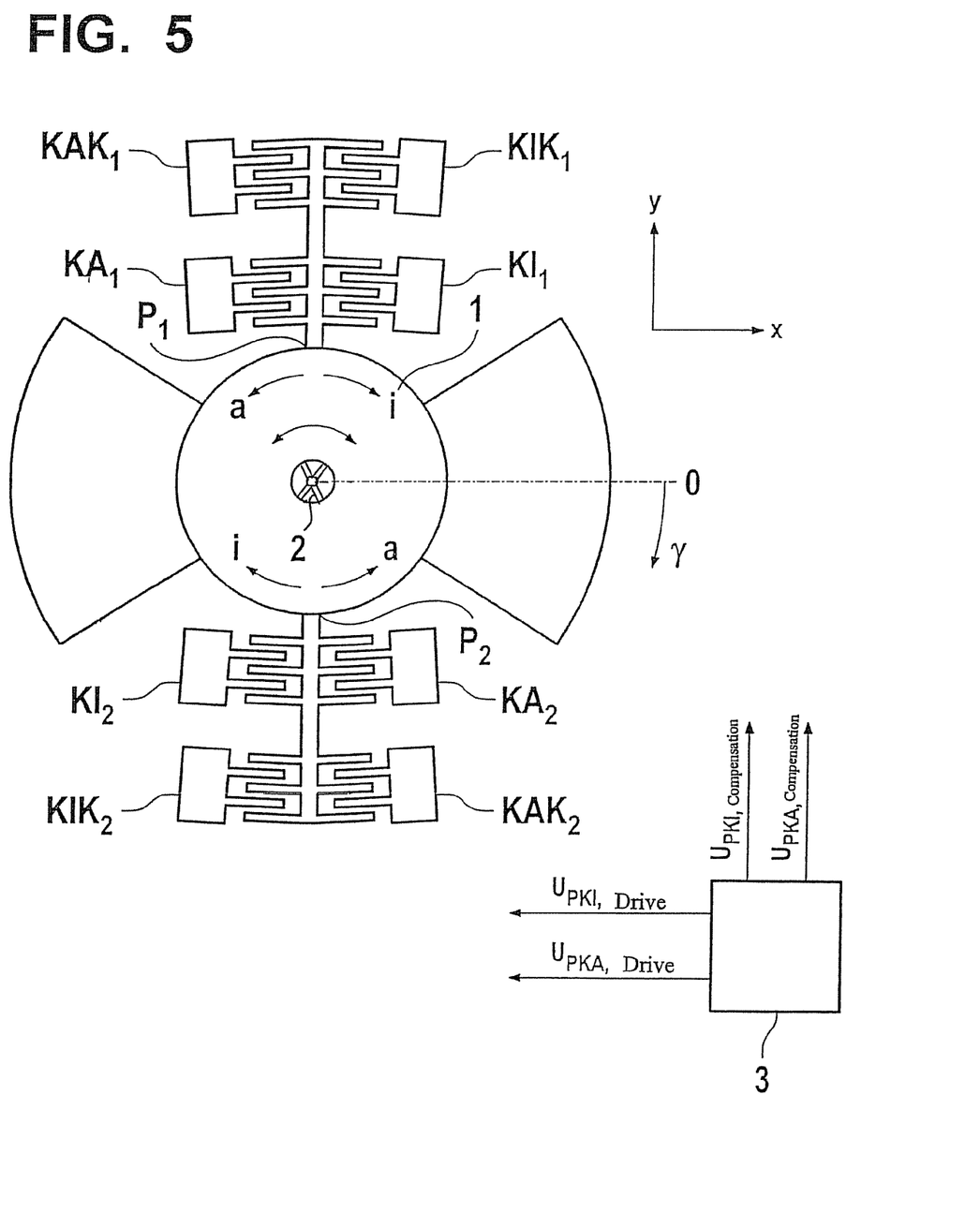
FIG. 5 shows a schematic top view of a second exemplary embodiment according to the present invention, in which additional compensation comb drive units are provided for compensating the non-linearity.

In the exemplary embodiment shown in FIG. 5, it is apparent that the additional compensation comb drive units KIK1, KIK2, KAK1, and KAK2 are also arranged in pairs and act upon the same points of application P1 and P2 of the inertial mass, situated diametrically opposite one another. The arrangement of four additional compensation comb drive units KIK1, KAK1 and KIK2, KAK2 in pairs used in this exemplary embodiment makes the configuration of this yaw rate sensor completely symmetric. Of course, the non-linearity may also be compensated using only two additional compensation comb drive units, for example, using compensation comb drive units KAK1 and KIK1 or compensation comb drive units KAK2 and KIK2. A system having only two compensation comb drive units KIK1 and KAK2 or KAK1 and KIK2 is also possible.

The above-mentioned simulation has also shown that the amplitude of the compensation voltage signal increases approximately linearly with deflection angle γ if, when designing the yaw rate sensor drive, it is ensured that the smallest possible deflection amplitudes are needed. The smallest possible non-linearity must be observed when designing the spring geometry. The additional compensation comb drive units described in the second exemplary embodiment offer the advantage compared to the first exemplary embodiment in the currently used yaw rate sensor technology that the comb drive units provided for the drive means may be designed for lower voltage amplitudes.

Figure 7:
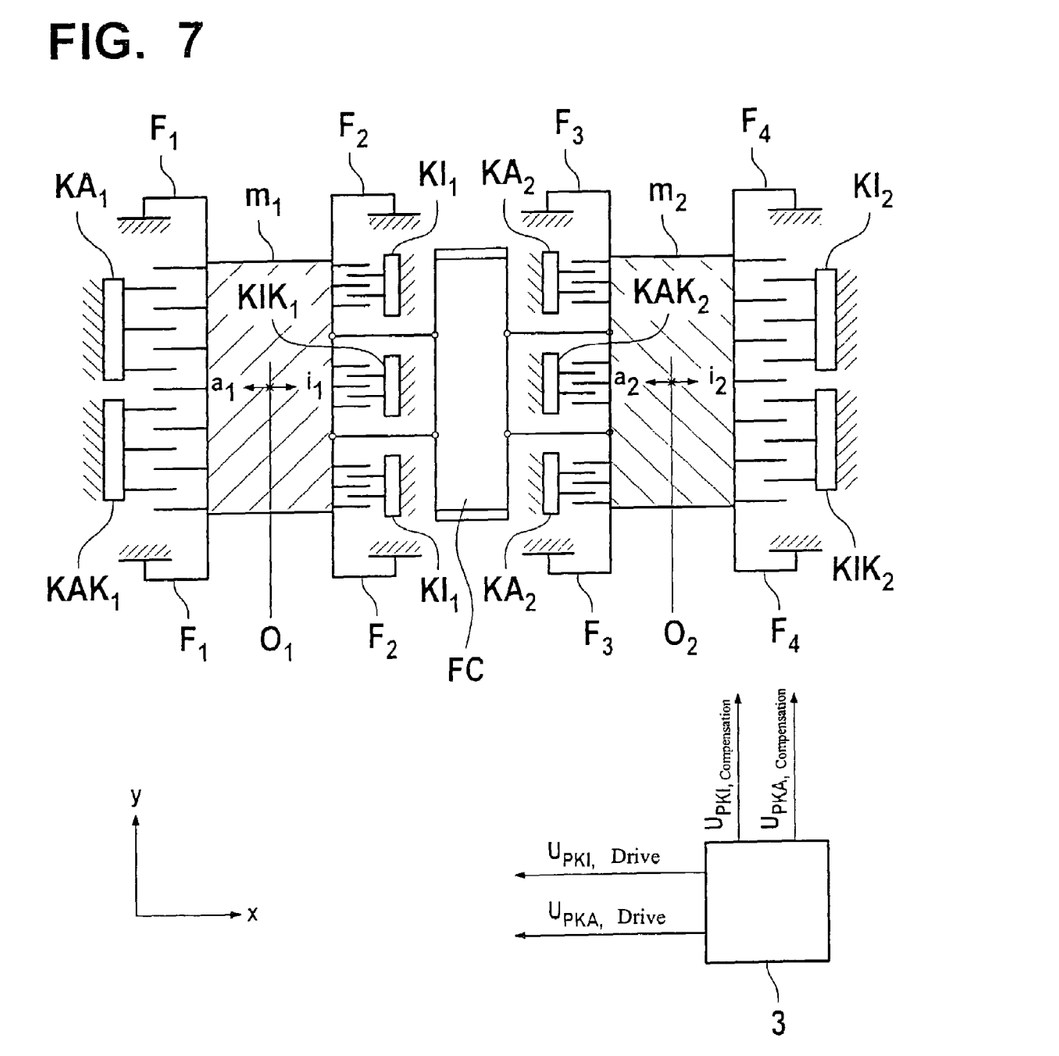
FIG. 7 shows a schematic top view of a third exemplary embodiment of a micromechanical motion sensor according to the present invention in the form of a linear oscillator in which additional compensation comb drive units are provided for compensating the non-linearity.

FIG. 7 shows a schematic top view of a third exemplary embodiment of a micromechanical motion sensor according to the present invention in the form of a linear oscillator in which additional compensation comb drive units are provided for compensating the non-linearity.

According to FIG. 7, the bar spring element has a system connected via a centrally located coupling spring FC and mounted via a symmetric spring suspension F1-F4 so it is able to perform linear oscillations, the system being composed in this case of two inertial masses m1, m2, which are excited by comb drive units KI1, KA1, KI2, KA2 to a linear oscillation in a lateral x-y plane to perform positive and negative deflections i1, i2 and a1, a2 of the same magnitude about their particular rest positions O1, O2. Accordingly, the bar spring element of FIG. 7 includes inertial masses m1, m2, symmetric spring suspension F1-F4, and coupling spring FC. The oscillation drive thus has four comb drive units controlled by a control unit 3 for exciting the two inertial masses m1, m2 of the inertial mass system, the drive forces of the comb drive units acting upon the two inertial masses at opposite points of application in the same lateral x-y plane in such a way that they excite inertial masses m1, m2 of the system about their particular rest positions O1, O2. Both coupling spring FC and spring suspension F1-F4 cause oscillation non-linearities, which are compensated according to the present invention. To compensate for non-linearity, the compensation drive means for each inertial mass m1, m2 of the system also have two compensation comb drive units KIK1, KAK1 and KIK2, KAK2, which act upon the same points of application of each inertial mass m1 and m2 as the comb drive units of the oscillation drive. For the drive and compensation voltage signals supplied by control unit 3, to the latter and to the compensation comb drive units, the same applies in principle as explained above with reference to the second exemplary embodiment illustrated in FIG. 5.

The control unit is able to advantageously approximate the oscillation curve of the compensation voltage signals via step signals having fine steps.

To achieve greater compensation moments with the same voltage, it is advantageous in the exemplary embodiments having separate compensation comb drive units to make the effective radius or effective distance of the compensation comb drive units greater than the effective radius or the effective distance of the oscillation drive comb drive units.

What is claimed is:

1. A micromechanical motion sensor, comprising:
    an electrostatic oscillating drive;
    an oscillatably mounted bar spring element capable of being excited to a permanent periodic oscillation by the electrostatic oscillating drive to which a periodic drive voltage is applied;
    an electrostatic compensation drive arrangement acting upon the bar spring element,
    wherein: an appropriate periodic compensation voltage is applied to the electrostatic compensation drive arrangement to compensate for a non-linearity of a spring constant of the bar spring element; and
    an arrangement for detecting a deflection imparted to the bar spring element.

2. The micromechanical motion sensor as recited in claim 1, wherein:
    the micromechanical motion sensor is configured as a linear oscillator in which the bar spring element has a system connected by a centrally located coupling spring and mounted via a symmetric spring suspension so it is able to perform linear oscillations,
    the system has a plurality of inertial masses, which are excited, by the oscillation drive, to a linear oscillation in a lateral plane having positive and negative deflections of the same magnitude about their particular rest positions,
    the oscillation drive for excitation of the inertial mass system has at least one comb drive unit controlled by a control unit in each case for the positive and negative deflections,
    drive forces of the comb drive unit act upon the inertial mass system at a plurality of points of application opposite one another on each inertial mass in the same lateral plane in such a way that they excite the inertial masses of the system about their particular rest positions, and
    the electrostatic compensation drive arrangement for each inertial mass has at least one comb drive unit which acts upon at least one of the points of application of each inertial mass.

3. The micromechanical motion sensor as recited in claim 2, wherein:
    the at least one comb drive unit of the electrostatic compensation drive arrangement is at least one of the comb drive units of the oscillation drive, and
    the drive voltage of the control unit is superposed with the compensation voltage to form a total excitation voltage.

4. The micromechanical motion sensor as recited in claim 2, wherein:
    the at least one comb drive unit of the electrostatic compensation drive arrangement is an additional compensation comb drive unit to which the control unit supplies only the compensation voltage separately.

5. The micromechanical motion sensor as recited in claim 4, wherein:
    the oscillation drive has four symmetric comb drive units, of which a first and second comb drive unit for positive and negative deflections, respectively, form a first pair which has a first shared point of application on the inertial mass and a third and fourth comb drive unit form a second pair for positive and negative deflections, respectively, which acts upon the second shared point of application on the inertial mass,
    the two comb drive units of each pair are situated opposite one another and parallel to an imaginary line which defines the rest position of the inertial mass and passes through its center in such a way that the drive forces of the comb drive units for positive deflection and the drive forces of the comb drive units for negative deflection are added up, and
    the control unit supplies the comb drive units for positive deflection with drive voltage in phase opposition to the drive voltage for the comb drive units for negative deflection.

6. The micromechanical motion sensor as recited in claim 5, wherein:
    the electrostatic compensation drive arrangement has two additional compensation comb drive units for positive and negative deflections, respectively, which act upon the inertial mass at the first and second shared points of application, respectively, and are situated in such a way that their forces for positive and negative deflections are added up and the control unit supplies the compensation voltage to the compensation comb drive unit for positive deflection in phase opposition to the compensation voltage supplied to the compensation comb drive unit for negative deflection.

7. The micromechanical motion sensor as recited in claim 5, wherein:
    the electrostatic compensation drive arrangement includes four additional compensation comb drive units of which the first and second comb drive units for positive and negative deflections, respectively, form a first pair which acts upon the inertial mass at the first shared point of application, and a third and fourth comb drive unit for positive and negative deflections, respectively, form a second pair which acts upon the inertial mass at the second shared point of application, the two compensation comb drive units of each pair are situated opposite one another and parallel to an imaginary line defining the rest position of the inertial mass and passing through its center in such a way that their drive forces for positive and negative deflections are added up, and the control unit supplies the compensation voltage to the compensation comb drive units for positive deflection in phase opposition to the compensation voltage supplied to the compensation comb drive units for negative deflection.

8. The micromechanical motion sensor as recited in claim 2, wherein:

the inertial mass system has a first and a second inertial mass, which are spring-elastically connected by a central coupling spring, the oscillation drive has four comb drive units of which a first and a second comb drive unit for positive and negative deflections, respectively, form a first pair which acts upon the first inertial mass, a third and fourth comb drive unit form a second pair for the positive and negative deflections, respectively, which acts upon the second inertial mass, the two comb drive units of each pair being situated on the particular inertial mass opposite one another in such a way that the drive forces of the comb drive units for positive deflection and the drive forces of the comb drive units for negative deflection add up, and the control unit supplies the drive voltage to the comb drive units for positive deflection in phase opposition to the drive voltage for the comb drive units for negative deflection.

9. The micromechanical motion sensor as recited in claim 8, wherein:

the electrostatic compensation drive arrangement has four additional compensation comb drive units of which the first and second for positive and negative deflections, respectively, form a first pair which acts upon the first inertial mass, and a third and fourth compensation comb drive units for positive and negative deflections, respectively, form a second pair which acts upon the second inertial mass, the two compensation comb drive units of each pair on the respective inertial mass are situated opposite one another in such a way that their drive forces for positive and negative deflections are added up, and the control unit supplies the compensation voltage to the compensation comb drive units for positive deflection in phase opposition to the compensation voltage supplied to the compensation comb drive units for negative deflection.

10. The micromechanical motion sensor as recited in claim 9, wherein:

the control unit generates the drive voltage for the comb drive units for positive deflection approximately symmetrically to each positive zero crossing of the oscillation of the inertial mass, and the drive voltage for the comb drive units for negative deflection approximately symmetrically to each negative zero crossing of the oscillation of the inertial mass.

11. The micromechanical motion sensor as recited in claim 10, wherein:

the control unit generates the compensation voltage for the compensation comb drive units for positive deflection delayed by approximately one-fourth of the oscillation period of the oscillation of the inertial mass with respect to the drive voltage for the comb drive units for negative deflection, and generates the compensation voltage for the compensation comb drive units for negative deflection delayed by approximately one-fourth of the oscillation period of the oscillation of the inertial mass with respect to the drive voltage for the comb drive units for positive deflection.

12. The micromechanical motion sensor as recited in claim 11, wherein:

the control unit generates the drive voltages for the comb drive units of the oscillation drive as square pulses, whose pulse duration is in each case one-half of the oscillation period of the oscillation of the inertial mass, and generates the compensation voltages for the compensation comb drive units as half-waves, respectively, of a harmonic oscillation having the same period as the oscillation of the inertial mass.

13. The micromechanical motion sensor as recited in claim 12, wherein the control unit generates the compensation voltages to have a greater amplitude than the drive voltages.

14. The micromechanical motion sensor as recited in claim 1, wherein:

the micromechanical motion sensor is configured as a yaw rate sensor in which the bar spring element has a centrally symmetric inertial mass mounted at a center of rotation of the inertial mass, via an X spring, the inertial mass is excited by the oscillation drive to perform rotary oscillations in a lateral plane having positive and negative deflections of the same magnitude about a rest position, the oscillation drive has at least one comb drive unit in each case, controlled by a control unit via a periodic drive voltage for exciting the inertial mass for the positive and negative deflections, the drive forces of the comb drive unit tangentially act upon the inertial mass at least one first point of application situated in the same lateral plane in such a way that they excite the inertial mass symmetrically about its rest position, and the electrostatic compensation drive arrangement has at least one comb drive unit which acts upon the same point of application and/or a diametrically opposed second point of application located at the same distance from the center of the inertial mass.

15. The micromechanical motion sensor as recited in claim 14, wherein:

the at least one comb drive unit of the electrostatic compensation drive arrangement is at least one of the comb drive units of the oscillation drive, and the drive voltage of the control unit is superposed with the compensation voltage to form a total excitation voltage.

16. The micromechanical motion sensor as recited in claim 15, wherein:

the oscillation drive has four symmetric comb drive units, of which a first and second comb drive unit for positive and negative deflections, respectively, form a first pair which has a first shared point of application on the inertial mass and a third and fourth comb drive unit form a second pair for positive and negative deflections, respectively, which acts upon the second shared point of application on the inertial mass, the two comb drive units of each pair are situated opposite one another and parallel to an imaginary line which defines the rest position of the inertial mass and passes through its center in such a way that the drive forces of the comb drive units for positive deflection and the drive forces of the comb drive units for negative deflection are added up, and the control unit supplies the comb drive units for positive deflection with drive voltage in phase opposition to the drive voltage for the comb drive units for negative deflection.

17. The micromechanical motion sensor as recited in claim 14, wherein:

the at least one comb drive unit of the electrostatic compensation drive arrangement is an additional compensation comb drive unit to which the control unit supplies only the compensation voltage separately.

18. The micromechanical motion sensor as recited in claim 17, wherein:

the oscillation drive has four symmetric comb drive units, of which a first and second comb drive unit for positive and negative deflections, respectively, form a first pair which has a first shared point of application on the inertial mass and a third and fourth comb drive unit form a second pair for positive and negative deflections, respectively, which acts upon the second shared point of application on the inertial mass, the two comb drive units of each pair are situated opposite one another and parallel to an imaginary line which defines the rest position of the inertial mass and passes through its center in such a way that the drive forces of the comb drive units for positive deflection and the drive forces of the comb drive units for negative deflection are added up, and the control unit supplies the comb drive units for positive deflection with drive voltage in phase opposition to the drive voltage for the comb drive units for negative deflection.

19. The micromechanical motion sensor as recited in claim 17, wherein:

the electrostatic compensation drive arrangement has two additional compensation comb drive units for positive and negative deflections, respectively, which act upon the inertial mass at the first and second shared points of application, respectively, and are situated in such a way that their forces for positive and negative deflections are added up and the control unit supplies the compensation voltage to the compensation comb drive unit for positive deflection in phase opposition to the compensation voltage supplied to the compensation comb drive unit for negative deflection.

20. The micromechanical motion sensor as recited in claim 17, wherein:

the electrostatic compensation drive arrangement includes four additional compensation comb drive units of which the first and second comb drive units for positive and negative deflections, respectively, form a first pair which acts upon the inertial mass at the first shared point of application, and a third and fourth comb drive unit for positive and negative deflections, respectively, form a second pair which acts upon the inertial mass at the second shared point of application, the two compensation comb drive units of each pair are situated opposite one another and parallel to an imaginary line defining the rest position of the inertial mass and passing through its center in such a way that their drive forces for positive and negative deflections are added up, and the control unit supplies the compensation voltage to the compensation comb drive units for positive deflection in phase opposition to the compensation voltage supplied to the compensation comb drive units for negative deflection.

* * * * *